United States Patent
Li et al.

(10) Patent No.: US 9,762,277 B2
(45) Date of Patent: Sep. 12, 2017

(54) SUPPORTING SIM TOOLKIT APPLICATIONS IN EMBEDDED UICCS

(71) Applicant: Apple Inc., Cupertino, CA (US)

(72) Inventors: Li Li, Los Altos, CA (US); Arun G. Mathias, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/236,303

(22) Filed: Aug. 12, 2016

(65) Prior Publication Data

US 2016/0352377 A1  Dec. 1, 2016

Related U.S. Application Data

(63) Continuation of application No. 14/720,670, filed on May 22, 2015, now Pat. No. 9,432,067.
(Continued)

(51) Int. Cl.
*H04B 1/3816* (2015.01)
*H04W 8/18* (2009.01)
(Continued)

(52) U.S. Cl.
CPC .......... *H04B 1/3816* (2013.01); *H04W 4/003* (2013.01); *H04W 8/183* (2013.01); *H04M 2250/14* (2013.01); *H04W 88/06* (2013.01)

(58) Field of Classification Search
CPC .... H04B 1/3816; H04W 4/003; H04W 8/183; H04W 88/06; H04M 2250/14
See application file for complete search history.

(56) References Cited

U.S. PATENT DOCUMENTS

| 9,432,067 | B2 * | 8/2016 | Li .................... H04W 4/003 |
| 2005/0176464 | A1 | 8/2005 | Portasany Sanchez |

(Continued)

FOREIGN PATENT DOCUMENTS

| WO | 2012058446 A1 | 5/2012 |
| WO | 2014043040 A1 | 3/2014 |

OTHER PUBLICATIONS

PCT Application No. PCTUS2015032316—International Search Report & Written Opinion dated Sep. 1, 2015.
(Continued)

*Primary Examiner* — Nguyen Vo
(74) *Attorney, Agent, or Firm* — Downey Brand LLP

(57) ABSTRACT

Disclosed herein is a technique for enabling Subscriber Identity Module (SIM) toolkit commands to be properly routed within a mobile device that includes an embedded Universal Integrated Circuit Card (eUICC) configured to manage two or more electronic SIMs (eSIMs). Specifically, the technique involves a baseband component of the mobile device and the eUICC initially exchanging information about their eSIM capabilities to identify whether multiple eSIMs are active within the eUICC. During this exchange of information, the eUICC can generate a list of unique identifiers of the active eSIMs that are managed by the eUICC and provide the list of unique identifiers to the baseband component. In turn, the baseband component can update a configuration to manage the list of unique identifiers and use the list of unique identifiers to properly route SIM toolkit commands to the appropriate eSIM within the eUICC.

20 Claims, 9 Drawing Sheets

Related U.S. Application Data

(60) Provisional application No. 62/056,395, filed on Sep. 26, 2014, provisional application No. 62/005,636, filed on May 30, 2014.

(51) Int. Cl.
*H04W 4/00* (2009.01)
*H04W 88/06* (2009.01)

(56) References Cited

U.S. PATENT DOCUMENTS

| | | |
|---|---|---|
| 2010/0105434 A1 | 4/2010 | Hong |
| 2012/0108205 A1 | 5/2012 | Schell et al. |
| 2013/0165073 A1* | 6/2013 | Madsen ................ H04W 12/06 455/411 |
| 2014/0073375 A1 | 3/2014 | Li et al. |
| 2015/0072736 A1* | 3/2015 | Berionne .......... H04W 52/0222 455/558 |
| 2015/0281198 A1 | 10/2015 | Lee et al. |

OTHER PUBLICATIONS

Taiwanese Application No. 104117502—Office Action dated May 5, 2016.

* cited by examiner

COMMAND PARAMETER TABLE — 402

| INDEX | NAME | VALUE | DESCRIPTION |
|---|---|---|---|
| 0 | CMD_C | 0001 | BASIC PHONE CALL |
| 1 | MAKE_CALL_C | 0002 | PLACE CALL |
| 2 | PHONE_NUMBER_C | 0003 | CALL NUMBER |
| 3 | OUTGOING_ESIM_C | 0004 | USE SPECIFIC ESIM |

ACTIVE ESIM TABLE — 404

| INDEX | UNIQUE ID | DESCRIPTION |
|---|---|---|
| 0 | DI8R78YI | eSIM #1 |
| 1 | H93GJK3E | eSIM #2 |
| 2 | UJ38KDIL | eSIM #1 |

450

460

Start an outgoing call to phone number "1-222-333-4444" with no eSIM specified cmd_c/4/make_call_c/phone_number_c/14/"1-222-333-4444"

TLV 462    TLV 464

470

Using eSIM #2, start an outgoing call to phone number "5-666-777-8888":

cmd_c/4/make_call_c/phone_number_c/14/"5-666-777-8888"/outgoing_eSIM_c/8/"H93GJK3E"

TLV 472    TLV 474    TLV 476

480

Using eSIM #1, start an outgoing call to phone number "9-000-111-2222":

cmd_c/4/make_call_c/phone_number_c/14/"9-000-111-2222"/outgoing_eSIM_c/8/"DI8R78YI"

TLV 478    TLV 480    TLV 482

*FIG. 4B*

SUPPORTING SIM TOOLKIT APPLICATIONS IN EMBEDDED UICCS

CROSS-REFERENCE TO RELATED APPLICATIONS

This application is a Continuation of U.S. patent application Ser. No. 14/720,670 filed May 22, 2015, which claims the benefit of U.S. Provisional Patent Application No. 62/056,395 filed Sep. 26, 2014, and U.S. Provisional Patent Application No. 62/005,636 filed May 30, 2014, both of which are incorporated by reference herein in their entireties.

FIELD

The described embodiments set forth a technique for supporting the operation of SIM toolkit commands in embedded Universal Integrated Circuit Cards (eUICCs) that manage multiple electronic Subscriber Identity Modules (eSIMs).

BACKGROUND

Most mobile devices are configured to receive removable Universal Integrated Circuit Cards (UICCs) that enable the mobile devices to access services provided by mobile network operators (MNOs). In particular, each UICC includes at least a microprocessor and a read-only memory (ROM), where the ROM is configured to store an MNO profile that the mobile device can utilize to register and interact with an MNO. Typically, a UICC takes the form of a small removable card (commonly referred to as a SIM card) that is configured to be inserted (e.g., using a tray) into a UICC-receiving bay included in a mobile device. In more recent implementations, however, UICCs are being embedded directly into system boards of mobile devices. Notably, these embedded UICCs (eUICCs) can provide several advantages over traditional, removable UICCs. For example, some eUICCs include a rewritable memory that can facilitate eSIM updates for accessing extended features provided by MNOs. eUICCs can also eliminate the need for UICC-receiving bays within mobile devices. The implementation of eUICCs, therefore, not only increases the flexibility of mobile devices, but also simplifies their design and frees up space for other components.

The flexibility provided by eUICCs has recently led to efforts to activate two or more eSIMs on a mobile device so that a user can communicate with two or more respective MNOs. Multiple active eSIMs present a problem, however, as SIM toolkit commands (e.g., TERMINAL PROFILE, ENVELOPE, FETCH, TERMINAL RESPONSE, etc.) are configured to be transmitted over a basic channel using a protocol that does not include information for identifying a source or destination associated with each SIM toolkit command. Specifically, the protocol omits this information because conventional techniques involve only a single physical UICC included in a mobile device, and, therefore, the source or destination associated with each SIM toolkit command is inherent. Consequently, when multiple eSIMs are active within an eUICC of a mobile device, there is a need to identify the source eSIM from which a SIM toolkit command issues or the destination eSIM to which a SIM toolkit command is directed.

SUMMARY

Representative embodiments set forth herein disclose various techniques for supplementing SIM toolkit commands with a unique identifier that identifies a particular eSIM from which each standard command originates or to which each standard command is directed. Each SIM toolkit command can be supplemented with the unique identifier using a variety of approaches, e.g., by including a type-length-value (TLV) component having data fields that can be parsed to identify whether a unique eSIM identifier is included with the standard command and to extract the unique eSIM identifier when included. In this manner, multiple eSIMs can be active within a mobile device while enabling eSIM toolkit commands to be properly routed to a corresponding eSIM.

One embodiment sets forth a method for routing commands to eSIMs managed by an eUICC included in a mobile device. The method includes initialization steps that involve issuing, to the eUICC, a request for an indication of the eSIMs that are managed by the eUICC, and, in response, receiving the indication from the eUICC, where the indication includes, for each eSIM managed by the eUICC, a unique identifier associated with the eSIM. Subsequent to the initialization, the method includes the step of receiving, from an application executing on the mobile device, a request to carry out an action associated with an MNO, where the request is directed to a specific eSIM of the eSIMs managed by the eUICC. In response to receiving the request, the mobile device generates a command associated with the action, where the command includes the unique identifier associated with the specific eSIM. The mobile device then routes the command to the eUICC to cause the specific eSIM to carry out the particular action. This action can include, for example, generating a sequence of instructions to be carried out by a baseband component (e.g., to establish a connection).

Another embodiment sets forth a method for routing commands to eSIMs managed by an eUICC included in a mobile device. Specifically, the method is carried out by the eUICC, and involves an initialization that includes receiving a request to provide an indication of the eSIMs that are managed by the eUICC, and, in response, providing the indication, where the indication includes unique identifiers for each of the eSIMs that are managed by the eUICC. Subsequent to the initialization, the eUICC can receive, from a requesting entity, a request to generate instructions for carrying out a particular action associated with an MNO, where the request includes a unique identifier of a specific eSIM managed by the eUICC to which the request is directed. In response, the eUICC directs the request to the specific eSIM, and, in turn, the eUICC receives, from the specific eSIM, a set of instructions for carrying out the particular action. Finally, the eUICC provides the instructions to the requesting entity—such as a baseband component included in the mobile device—whereupon the baseband component can execute the instructions to perform a particular action (e.g., send a message).

Another embodiment sets forth a mobile device that comprises an eUICC, a baseband component, a processor, and at least one memory. Specifically, the at least one memory is configured to store instructions that, when executed by the processor, cause the mobile device to carry out steps that include an initialization step. In particular, the initialization step involves exchanging capability information between the eUICC and the baseband component, where the capability information indicates that each of the eUICC and the baseband component are capable of simultaneously managing two or more eSIMs. The steps also include updating a configuration of both the eUICC and the baseband component to cause each command issued between the eUICC and the baseband component to include a unique identifier of a particular eSIM to which the command is directed.

Yet another embodiment of the invention sets forth a non-transitory computer readable storage medium configured to store instructions that, when executed by a processor included in a mobile device, cause the mobile device to carry out the various techniques set forth herein.

This Summary is provided merely for purposes of summarizing some example embodiments so as to provide a basic understanding of some aspects of the subject matter described herein. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

Other aspects and advantages of the embodiments described herein will become apparent from the following detailed description taken in conjunction with the accompanying drawings which illustrate, by way of example, the principles of the described embodiments.

BRIEF DESCRIPTION OF THE DRAWINGS

The included drawings are for illustrative purposes and serve only to provide examples of possible structures and arrangements for the disclosed inventive apparatuses and methods for providing wireless computing devices. These drawings in no way limit any changes in form and detail that may be made to the embodiments by one skilled in the art without departing from the spirit and scope of the embodiments. The embodiments will be readily understood by the following detailed description in conjunction with the accompanying drawings, wherein like reference numerals designate like structural elements.

FIGS. 4A-4B illustrate conceptual diagrams that set forth example structures for tables and commands that can be used to implement the various techniques described herein, according to one embodiment.

DETAILED DESCRIPTION

Figure 1:
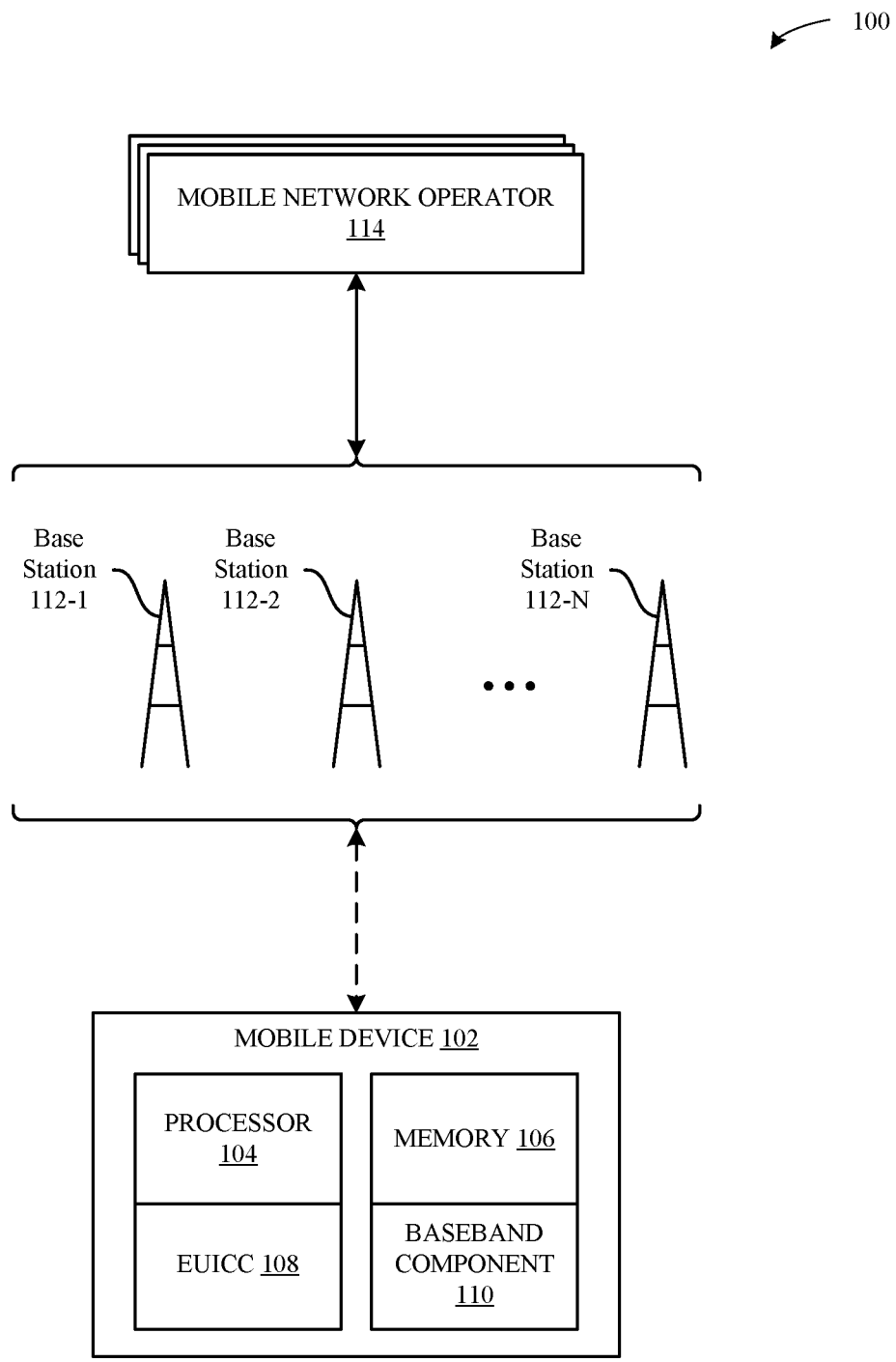
FIG. 1 illustrates a block diagram of different components of a system configured to implement the various techniques described herein, according to some embodiments.

Representative applications of apparatuses and methods according to the presently described embodiments are provided in this section. These examples are being provided solely to add context and aid in the understanding of the described embodiments. It will thus be apparent to one skilled in the art that the presently described embodiments can be practiced without some or all of these specific details. In other instances, well known process steps have not been described in detail in order to avoid unnecessarily obscuring the presently described embodiments. Other applications are possible, such that the following examples should not be taken as limiting.

Recent advances have led to the demand for mobile devices that are capable of managing two or more eSIMs to provide increased connectivity flexibility to users, e.g., enabling users to receive/transmit communications over two or more respective MNO operators. Providing this flexibility, however, presents several challenges given that conventional architectures were designed to support only a single active SIM within a mobile device. In particular, SIM toolkit commands, which carry out the basic functionality expected to be provided by mobile devices—such as making phone calls—are designed to be transmitted over a basic channel using a protocol that does not identify a particular eSIM with which the SIM toolkit command is associated. Consequently, routing issues occur when SIM toolkit commands are issued within a mobile device that includes two or more active eSIMs.

Accordingly, the embodiments set forth herein provide various techniques for enabling SIM toolkit commands to be properly routed within a mobile device when two or more eSIMs are active within the mobile device. To achieve these techniques, one embodiment of the invention involves a baseband component of a mobile device and an eUICC of the mobile device exchanging information about their eSIM capabilities—e.g., whether or not two or more eSIMs can be activated. This exchange of information can occur, for example, during an initialization of the mobile device, when a change occurs to the eSIMs managed by the eUICC (e.g., when a new eSIM is downloaded, when a removable UICC is inserted into a receiving bay included in the mobile device, etc.). During this exchange of information, the baseband component/eUICC can indicate to the eUICC/baseband component a capability to manage two or more active eSIMs. Assuming that this indication takes place during the exchange of the information, the eUICC can generate a list of unique identifiers of eSIMs that are managed by the eUICC and provide the list to the baseband component. In turn, the baseband component can update a configuration to manage the list of unique identifiers.

According to the foregoing approach, the baseband component and the eUICC, when generating SIM toolkit commands directed toward one another, can supplement each SIM toolkit command with a unique identifier that identifies a particular eSIM with which the SIM toolkit command is associated. One embodiment involves supplementing each SIM toolkit command with a TLV component that is configured to carry a unique identifier of a particular eSIM that is associated with the SIM toolkit command, where the TLV is a packet of data that indicates a "Type" field, a "Length" field, and a "Value" field. Specifically, the "Type" field of the TLV can indicate that the TLV represents a unique identifier for an eSIM, e.g., "eSIM ID", the "Length" field of the TLV can indicate the overall length of the unique identifier, e.g., 8-bytes, and the "Value" field of the TLV can store the unique identifier, e.g., "eSIM_A". In this manner, each SIM toolkit command (e.g., "FETCH") issued within the mobile device is supplemented with associated eSIM information that enables the SIM toolkit command to be properly routed within the mobile device.

Accordingly, the foregoing approaches provide techniques for enabling components within a mobile device—such as a baseband component and an eUICC—to determine whether multi-eSIM capabilities are available, and to correspondingly update their configurations using the techniques set forth above. These approaches provide the non-obvious advantage of enabling mobile devices to provide extended features to users while remaining backward compatible with legacy approaches. A more detailed discussion of these techniques is set forth below and described in conjunction with FIGS. 1-8, which illustrate detailed diagrams of systems and methods that can be used to implement these techniques.

In accordance with various embodiments described herein, the terms "wireless communication device," "wireless device," "mobile device," "mobile station," and "user equipment" (UE) may be used interchangeably herein to describe one or more common consumer electronic devices that may be capable of performing procedures associated with various embodiments of the disclosure. In accordance with various implementations, any one of these consumer electronic devices may relate to: a cellular phone or a smart phone, a tablet computer, a laptop computer, a notebook computer, a personal computer, a netbook computer, a media player device, an electronic book device, a MiFi® device, a wearable computing device, as well as any other type of electronic computing device having wireless communication capability that can include communication via one or more wireless communication protocols such as used for communication on: a wireless wide area network (WWAN), a wireless metro area network (WMAN) a wireless local area network (WLAN), a wireless personal area network (WPAN), a near field communication (NFC), a cellular wireless network, a fourth generation (4G) LTE, LTE Advanced (LTE-A), and/or 5G or other present or future developed advanced cellular wireless networks. The wireless communication device, in some embodiments, can also operate as part of a wireless communication system, which can include a set of client devices, which can also be referred to as stations, client wireless devices, or client wireless communication devices, interconnected to an access point (AP), e.g., as part of a WLAN, and/or to each other, e.g., as part of a WPAN and/or an "ad hoc" wireless network. In some embodiments, the client device can be any wireless communication device that is capable of communicating via a WLAN technology, e.g., in accordance with a wireless local area network communication protocol. In some embodiments, the WLAN technology can include a Wi-Fi (or more generically a WLAN) wireless communication subsystem or radio, the Wi-Fi radio can implement an Institute of Electrical and Electronics Engineers (IEEE) 802.11 technology, such as one or more of: IEEE 802.11a; IEEE 802.11b; IEEE 802.11g; IEEE 802.11-2007; IEEE 802.11n; IEEE 802.11-2012; IEEE 802.11ac; or other present or future developed IEEE 802.11 technologies.

FIG. 1 illustrates a block diagram of different components of a system 100 that is configured to implement the various techniques described herein, according to some embodiments. More specifically, FIG. 1 illustrates a high-level overview of the system 100, which, as shown, includes a mobile device 102 and a group of base stations 112 that are managed by different MNOs 114. According the illustration of FIG. 1, the mobile device 102 can represent a mobile computing device (e.g., an iPhone® or an iPad® by Apple®), the base stations 112 can represent different radio towers that are configured to communicate with the mobile device 102, and the MNOs 114 can represent different wireless service providers that provide specific services (e.g., voice and data) to which the mobile device 102 can be subscribed.

As shown in FIG. 1, the mobile device 102 can include a processor 104, a memory 106, an eUICC 108, and a baseband component 110. These components work in conjunction to enable the mobile device 102 to provide useful features to a user of the mobile device 102, such as localized computing, location based services, and Internet connectivity. As described in greater detail below, the eUICC 108 can be configured to store multiple eSIMs for accessing the different MNOs 114 through the base stations 112. For example, the eUICC 108 can be configured to store an eSIM for each MNO 114 to which mobile device 102 is subscribed, and to enable two or more of the eSIMs to be active within the mobile device 102 so that the mobile device 102 can simultaneously access the different services provided by the MNOs 114. Although not illustrated in FIG. 1, the mobile device 102 can also be configured to include a receiving bay for receiving a removable UICC (e.g., using a tray that houses the removable UICC and is formatted for the bay), where the UICC manages one or more SIMs. In this manner, the mobile device 102 can be further configured to provide the benefit of multi-MNO connectivity using a variety approaches, e.g., activating one eSIM managed by the eUICC 108 to connect to a first MNO 114 and activating another SIM managed by a removable UICC to connect to a second MNO 114.

Figure 2:
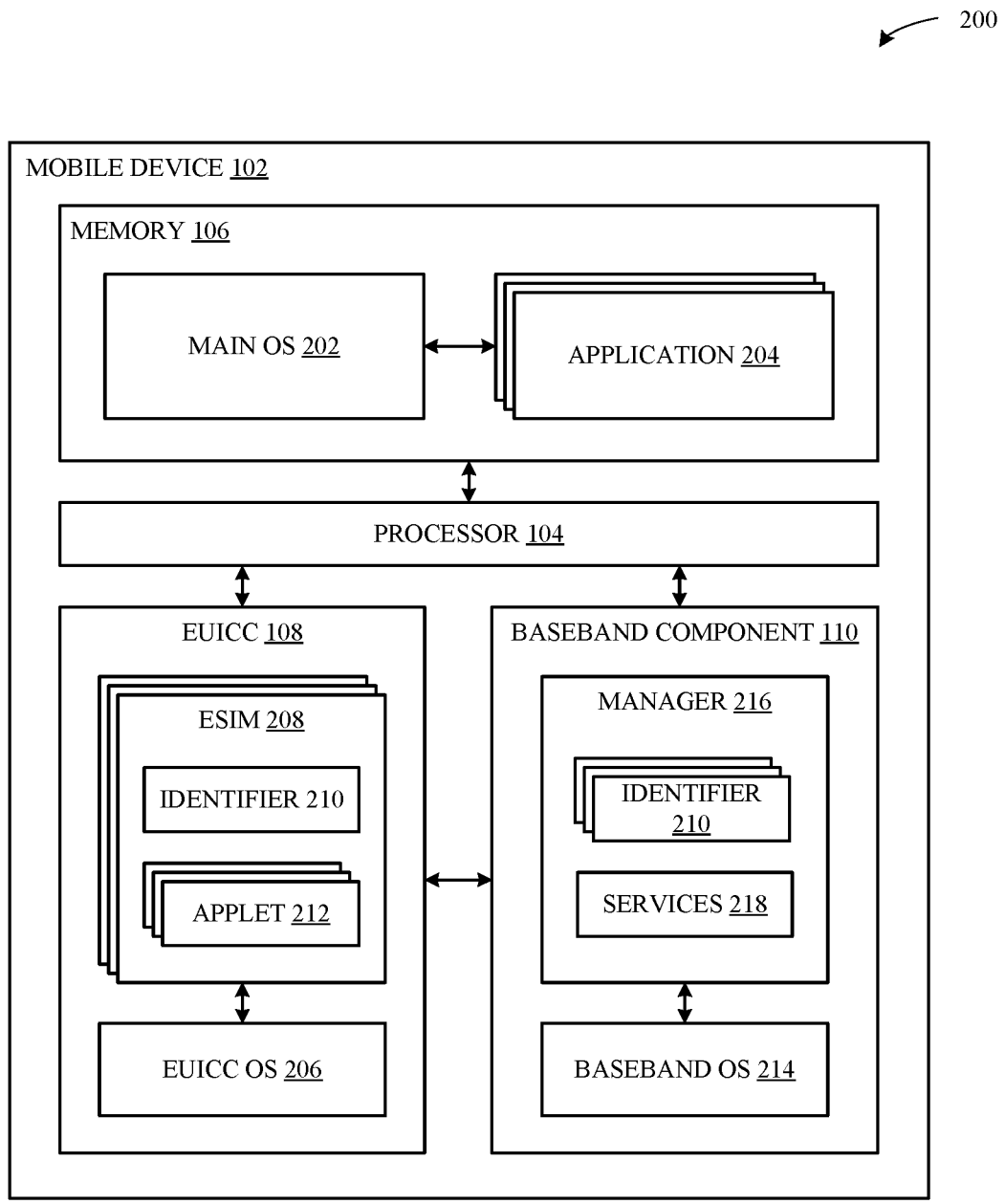
FIG. 2 illustrates a block diagram of a more detailed view of particular components of the system of FIG. 1, according to some embodiments.

FIG. 2 illustrates a block diagram of a more detailed view 200 of particular components of the mobile device 102 of FIG. 1, according to some embodiments. As shown in FIG. 2, the processor 104, in conjunction with the memory 106, can implement a main operating system (OS) 202 that is configured to execute applications 204 (e.g., native OS applications and user applications). As also shown in FIG. 2, the eUICC 108 can be configured to implement an eUICC OS 206 that is configured to manage the hardware resources of the eUICC 108 (e.g., a processor and a memory). The eUICC OS 206 can also be configured to manage eSIMs 208 that are stored by the eUICC 108, e.g., by activating the eSIMs 208 within the eUICC 108 and providing the baseband component 110 with access to the eSIMs 208. According to the illustration shown in FIG. 2, each eSIM 208 can be associated with a unique identifier 210 and can include multiple applets 212 that define the manner in which the eSIM 208 operates. For example, one or more of the applets 212, when implemented by the baseband component 110 and the eUICC 108, can be configured to enable the mobile device 102 to communicate with an MNO 114 and provide useful features (e.g., phone calls and internet) to a user of the mobile device 102.

As also shown in FIG. 2, the baseband component 110 of the mobile device 102 can include a baseband OS 214 that is configured to manage the hardware resources of the baseband component 110 (e.g., a processor, a memory, different radio components, etc.). According to one embodiment, the baseband component 110 can implement a manager 216 that is configured to interface with the eUICC 108 to implement the various techniques described herein, which include exchanging eSIM capability information with the eUICC OS 206 and managing a list of unique identifiers 210 when the eUICC 108 manages two or more eSIMs 208. As also shown in FIG. 2, the manager 216 can be configured to implement services 218, which represents a collection of software modules that are instantiated by way of the various applets 212 of activated eSIMs 208 that are included in the eUICC 108. For example, services 218 can be configured to manage the different connections that exist between the mobile device 102 and the MNOs 114 according to the different eSIMs 208 that are activated.

Figure 3:
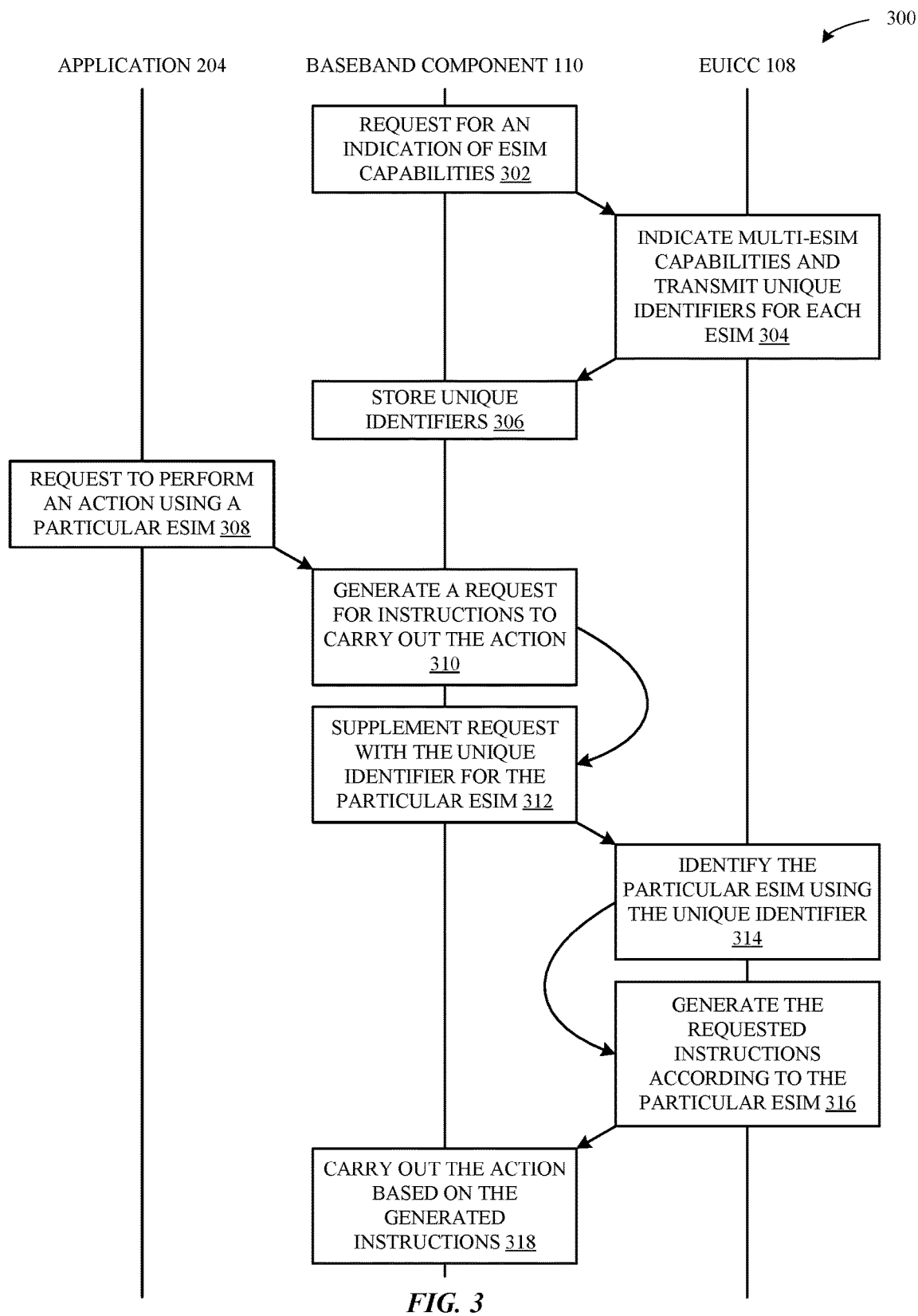
FIG. 3 illustrates a sequence diagram of a method for enabling a baseband component of the mobile device of FIG. 1 to exchange eSIM capability information with an eUICC component of the mobile device of FIG. 1, according to some embodiments.

FIG. 3 illustrates a sequence diagram of a method 300 for enabling the baseband component 110 to exchange eSIM capability information with the eUICC 108, according to some embodiments. As shown, the method 300 begins at step 302, where the baseband component 110 issues to the eUICC 108 a request for an indication of eSIM capabilities. Alternatively, step 302 can involve the eUICC 108 issuing to the baseband component 110 a request for an indication of eSIM capabilities, such that step 302 represents an initial request to exchange information between the eUICC 108 and the baseband component 110. At step 304, the eUICC 108, in response to the request received from the baseband component 110, indicates single-eSIM or multi-eSIM capabilities to the baseband component 110. When the eUICC 108 stores only a single eSIM 208—or, when only a single eSIM 208 is active within the eUICC 108—a transfer of the unique identifier 210 associated with the eSIM 208 is not necessary. Assuming, however, that the eUICC 108 indicates multi-eSIM capabilities, the eUICC 108, at step 304, shares unique identifiers 210 for each of the eSIMs 208 managed by the eUICC 108. In some cases, the eUICC 108 can choose to only share unique identifiers 210 for eSIMs 208 that are activated within the eUICC 108, since, in most cases, SIM toolkit commands would not be routed to deactivated eSIMs 208 managed by the eUICC 108.

At step 306, the baseband component 110 responds to the indication made by the eUICC 108 by updating a configuration of the services 218 to reflect the eSIM capabilities of the eUICC 108. The baseband component 110 also stores the unique identifiers 210 received from the eUICC 108 (when multi-eSIM capabilities are indicated by the eUICC 108). Accordingly, at the completion of step 306, each of the baseband component 110 and the eUICC 108 are aligned with one another and capable of supplementing SIM toolkit commands with unique identifiers 210 when necessary.

Steps 308-318 represent a series of steps that can occur when two or more eSIMs 208 are active within the mobile device 102. A procedure for establishing two or more active eSIMs 208 can involve, for example, opening different channels between the baseband component 110 and the eUICC 108, and, for each opened channel, selecting a different eSIM 208 to activate on the channel. Subsequently, and as described in greater detail below in conjunction with steps 308-312—as well as FIGS. 4A-4B—communication between the eUICC 108 and the baseband component 110 that regards, for example, a particular eSIM 208, can be carried out over a basic channel (e.g., channel 0) by including information (e.g., via a TLV component) that references the particular eSIM 208.

Figure 5:
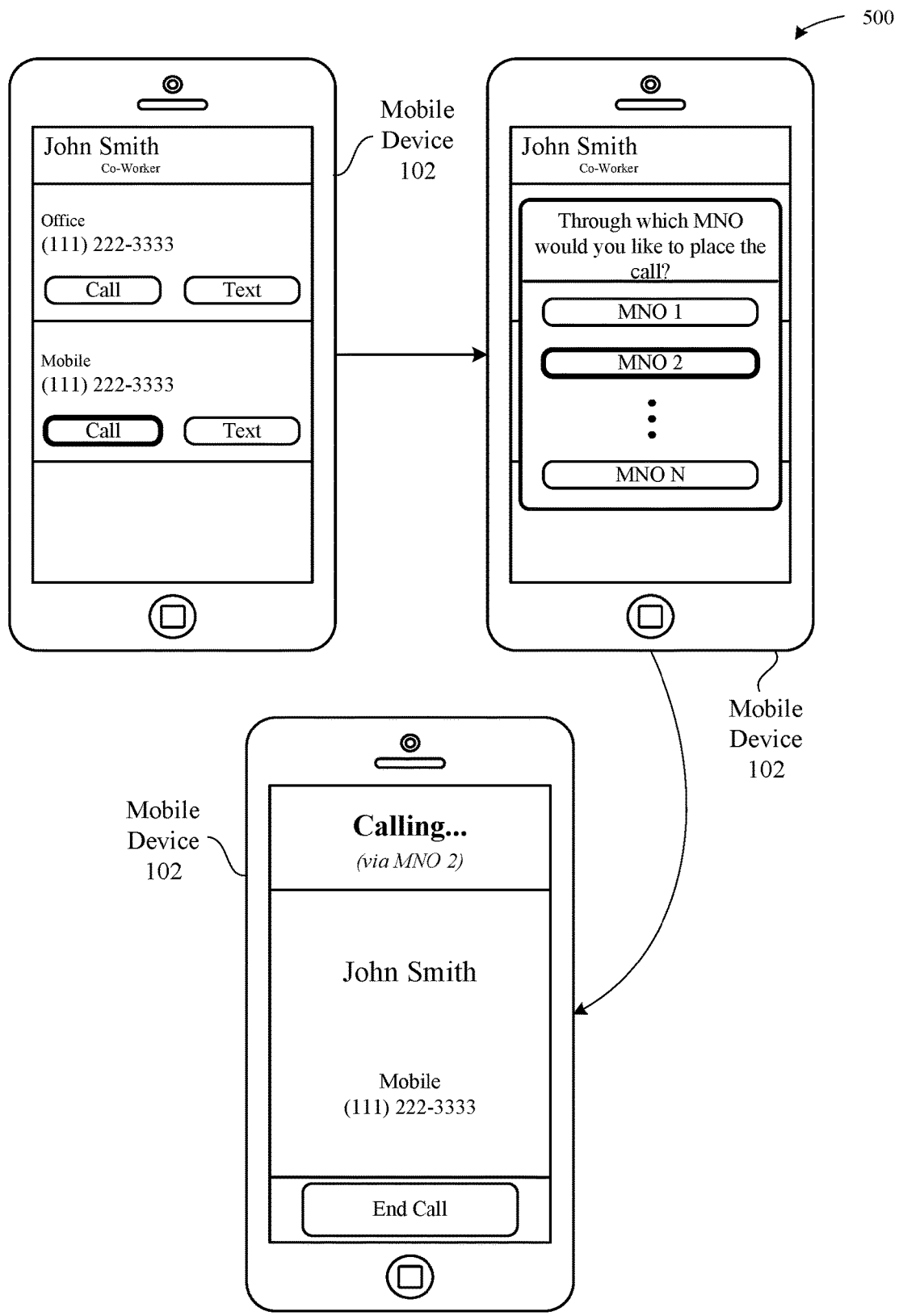
FIG. 5 illustrates a conceptual diagram of an example sequence that involves enabling a user to select from two or more MNOs when placing a phone call using the mobile device of FIG. 1, according to one embodiment.

In accordance with this example, steps 308-312 set forth a sequence where an application 204 executing on the mobile device 102 requests to perform an action associated with an MNO using a specific eSIM 208 of the two or more eSIMs 208. As shown in FIG. 3, the sequence of steps begins at step 308, where the application 204 executing on the mobile device 102—such as a native phone application—issues a request to the baseband component 110 to perform an action (e.g., placing a phone call) using a particular eSIM 208 managed by the eUICC 108. In some cases, the request issued by the application 204 can include information that identifies the particular eSIM 208 that should be used to carry out the action. For example, if the action involves placing a phone call, a user of the mobile device 102 can be prompted to select from a list of active eSIMs 208 through which he or she would like to place the phone call. An example of this selection process is illustrated in FIG. 5 and is discussed below in greater detail.

At step 310, the baseband component 110 receives the request from the application 204, and, in response, the baseband component 110 generates a request for instructions to carry out the action. Next, at step 312, the baseband component 110 identifies the particular eSIM 208 to which the request for instructions is directed, and accordingly supplements request with the unique identifier 210 for the particular eSIM 208. Again, the unique identifier 210 is made available to the baseband component 110 through steps 302-306, which involve sharing eSIM capability information and transferring unique identifiers 210 for eSIMs 208.

At step 314, the eUICC 108 receives the request for instructions, and, in response, the eUICC 108 identifies, using the unique identifier 210 included in the request for instructions, the particular eSIM 208 to which the request for instructions is directed. At step 316, the application 204 generates the instructions according to the particular eSIM 208. This can involve, for example, passing the request to the particular eSIM 208 within the eUICC 108, whereupon the eSIM 208 generates instructions that are compatible with an MNO 114 through which the action to be performed (as requested at step 308) will be carried out. Finally, at step 318, the baseband component 110 receives the generated instructions from the eUICC 108, and carries out the action based on the generated instructions.

FIGS. 4A-4B illustrate conceptual diagrams that set forth example structures for tables and commands that can be used to implement the various techniques described herein, according to one embodiment. Specifically, FIG. 4A illustrates a conceptual diagram 400 that includes a command parameter table 402, which, as shown, includes an example set of commands that can be used to cause the mobile device 102 to carry out different actions. In particular, the commands can be issued by the baseband component 110 to a particular eSIM 208 included in the eUICC 108 in order to generate instructions to carry out a particular action. As shown in FIG. 4A, each command in the command parameter table 402 is associated with a name, a value, and a description that define the nature of the command and enable the command to be packaged into a TLV component. FIG. 4A also illustrates an active eSIM table 404 that can be used to manage the unique identifiers 210 for eSIMs 208 that are managed by the eUICC 108. For example, the active eSIM table 404 shown in FIG. 4A includes entries for three different eSIMs 208 that are managed by the eUICC 108. In particular, the active eSIM table 404 includes an entry for a first eSIM 208 whose unique identifier 210 is "DI8R78YT", an entry for a second eSIM 208 whose unique identifier 210 is "H93GJK3E", and an entry for a third eSIM 208 whose unique identifier 210 is "UJ38KDIL".

FIG. 4B illustrates a conceptual diagram 450 that includes various examples of commands that can be issued from the baseband component 110 to the eUICC 108 using TLV components, according to one embodiment. Specifically, example 460 involves establishing a command to initiate an outgoing phone call to the phone number "1-222-333-4444" with no eSIM specified, which indicates to the eUICC 108 that a default eSIM 208 should be selected to place the outgoing phone call. In general, and as previously set forth herein, this scenario can exist when the eUICC 108 stores only a single eSIM 208, or when only a single eSIM 208 is active within the eUICC 108. As shown, the command can established using a TLV 462 and a TLV 464 whose data fields collectively make up the command. Example 470 involves a command for initiating an outgoing phone call to the phone number "5-666-777-8888" using the second eSIM 208 included in the active SIM table 404, where the unique identifier 210 associated with the second eSIM 208 is "H93GJK3E". As shown, the command can established using a TLV 472, a TLV 474, and a TLV 476 whose data fields collectively make up the command. Finally example 480 involves a command for initiating an outgoing phone call to the phone number "9-000-111-2222" using the first eSIM 208 included in the active SIM table 404, where the unique identifier 210 associated with the first eSIM 208 is "DI8R78YI". As shown, the command can be established using a TLV 478, a TLV 480, and a TLV 482 whose data fields collectively make up the command.

FIG. 5 illustrates a conceptual diagram 500 of an example sequence that involves enabling a user to select from two or more MNOs 114 when placing a phone call using his or her mobile device 102, according to one embodiment. The user interfaces illustrated in FIG. 5 can be generated by an application 204 executing on the mobile device 102. A first step of the sequence involves receiving from the user a selection of a phone number to contact. A second step of the sequence involves identifying the active eSIMs 208 managed by the eUICC 108 and presenting a list of MNOs 114 associated with the active eSIMs 208 to the user for selection. A third step of the sequence involves receiving a selection of one of the MNOs 114 and carrying out the appropriate steps described herein—such as in steps 308-318 of FIG. 3—to enable the phone call to take place through the selected MNO 114.

Figure 6:
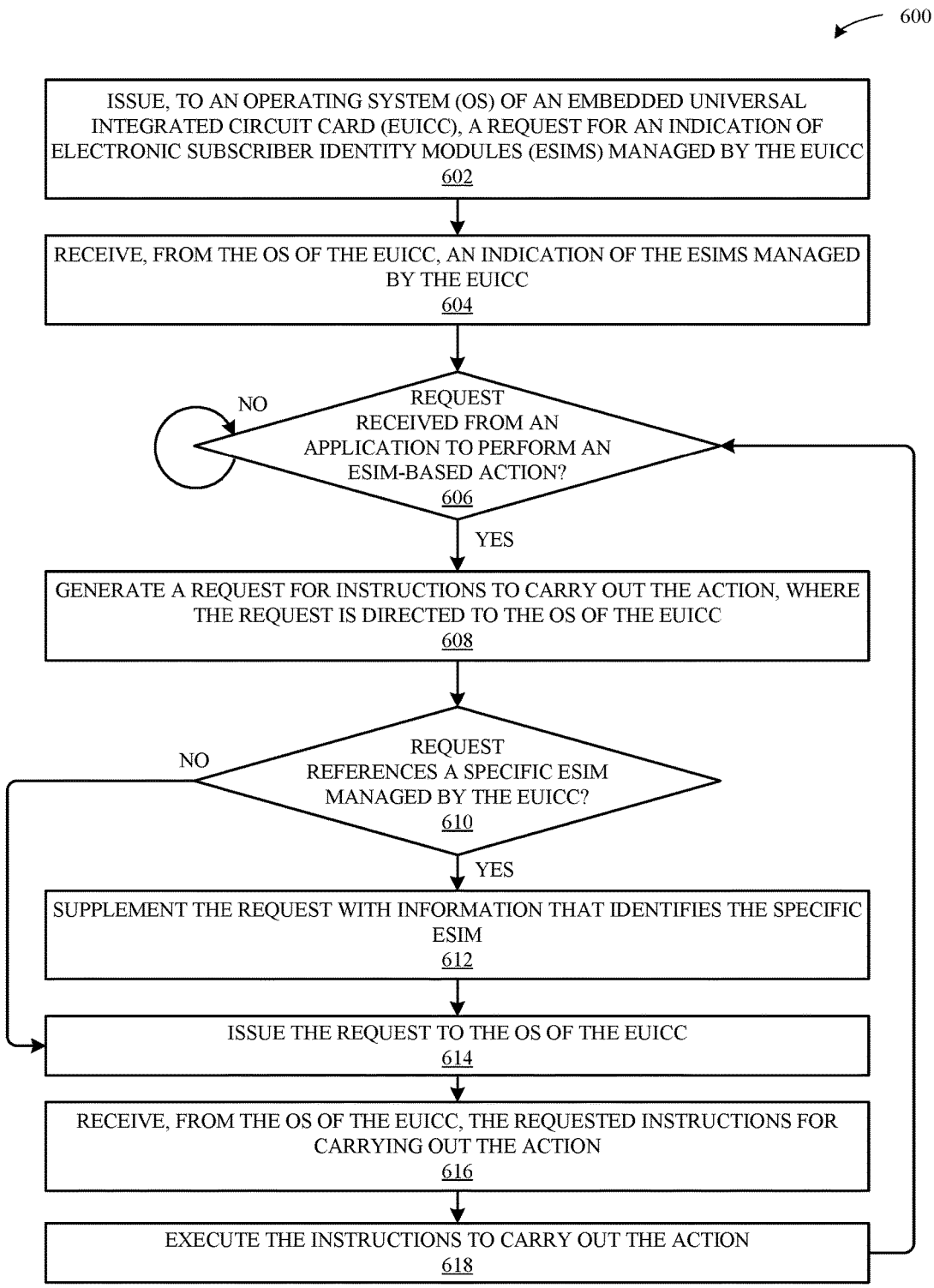
FIG. 6 illustrates a method that is carried out by the baseband component of the mobile device of FIG. 1 and involves interfacing with the eUICC component of the mobile device of FIG. 1, according to one embodiment.

FIG. 6 illustrates a method 600 that is carried out by the baseband component 110 of FIG. 1 and involves interfacing with the eUICC 108 of FIG. 1, according to one embodiment. As shown, the method 600 begins at step 602, where the manager 216 of the baseband component 110 issues, to the eUICC OS 206, a request for an indication of eSIMs 208 that are managed by the eUICC 108. At step 604, the manager 216 receives, from the eUICC OS 206, an indication of the eSIMs 208 managed by the eUICC 108. At step 606, the manager 216 determines whether a request is received from an application 204 to perform an eSIM-based action. If, at step 606, the manager 216 determines that a request is received from an application 204 to perform an eSIM-based action, then the method 600 proceeds to step 608. Otherwise, the method 600 repeats at step 606 until a request is received from an application 204 to perform an eSIM-based action.

At step 608, the manager 216 generates a request for instructions to carry out the eSIM-based action, where the request is directed to the eUICC OS 206 of the eUICC 108. At step 610, the manager 216 determines whether the request references a specific eSIM 208 managed by the eUICC 108. If, at step 610, the manager 216 determines that request references a specific eSIM 208 managed by the eUICC 108, then the method 600 proceeds to step 612. Otherwise, the method 600 proceeds to step 614, where the manager 216 issues the request (without information that identifies an eSIM 208) to the eUICC OS 206 of the eUICC 108. At step 612, the manager 216 supplements the request with information that identifies the specific eSIM 208. At step 616, the manager 216 receives, from the eUICC OS 206 of the eUICC 108, the requested instructions for carrying out the eSIM-based action. Finally, at step 618, the manager 216 executes the instructions to carry out the eSIM-based action, and the method 600 returns back to step 606 where additional requests can be processed.

Figure 7:
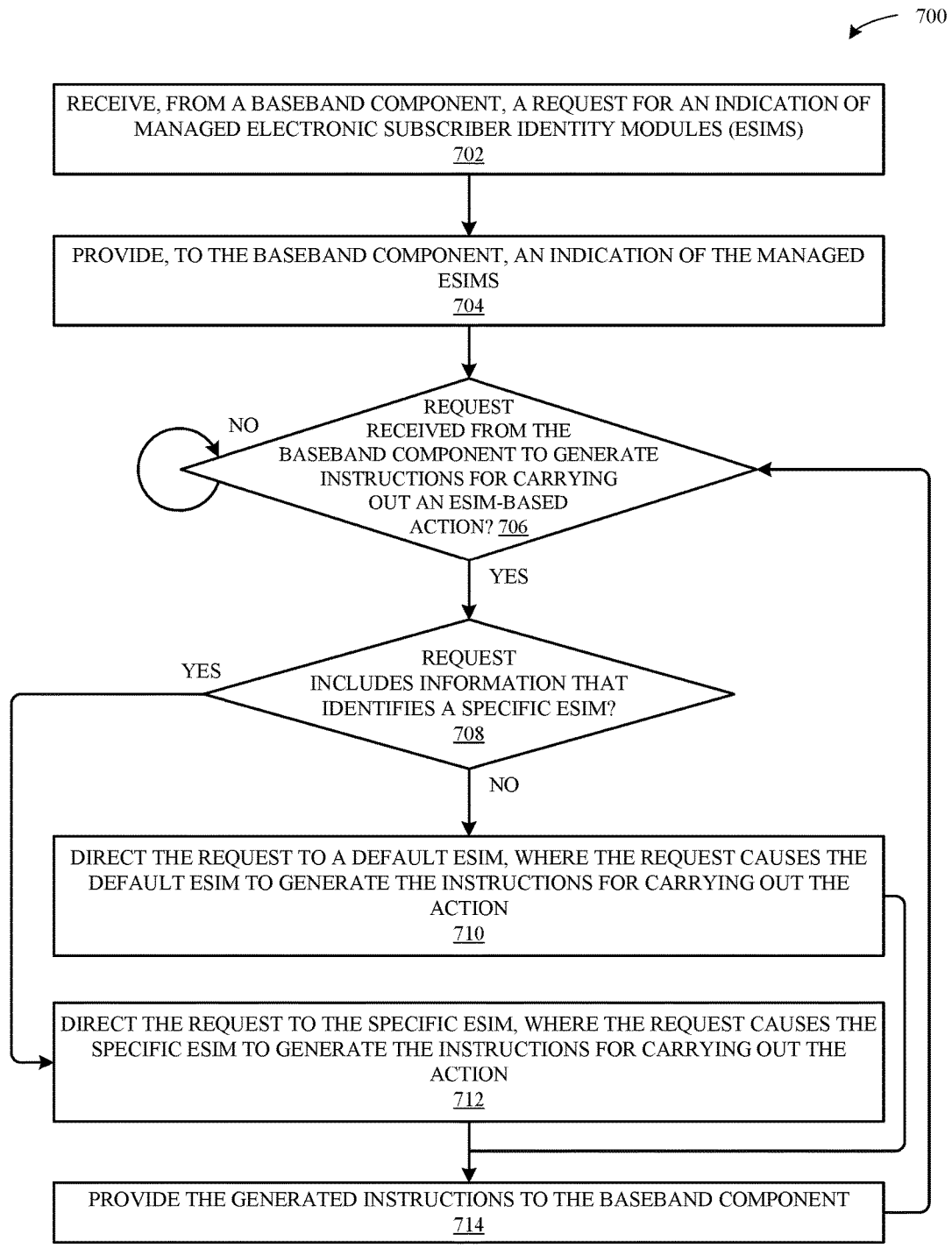
FIG. 7 illustrates a method that is carried out by the eUICC component of the mobile device of FIG. 1 and involves interfacing with the baseband component of the mobile device of FIG. 1, according to one embodiment.

FIG. 7 illustrates a method 700 that is carried out by the eUICC 108 of FIG. 1 and involves interfacing with the baseband component 110 of FIG. 1, according to one embodiment. As shown, the method 700 begins at step 702, where the eUICC OS 206 receives, from the baseband component 110, a request for an indication of eSIMs 208 that are managed by the eUICC 108. At step 704, the eUICC OS 206 provides, to the baseband component 110, an indication of the managed eSIMs 208. At step 706, the eUICC OS 206 determines whether a request is received from the baseband component 110 to generate instructions for carrying out an eSIM-based action. If, at step 706, the eUICC OS 206 determines that a request is received from the baseband component 110 to generate instructions for carrying out an eSIM-based action, then the method 700 proceeds to step 708. Otherwise, the method 700 repeats at step 706 until a request is received from the baseband component 110 to generate instructions for carrying out an eSIM-based action.

At step 708, the eUICC OS 206 determines whether the request received at step 706 includes information that identifies a specific eSIM 208 that is managed by the eUICC 108. If, at step 708, the eUICC OS 206 determines that the request does not include information that identifies a specific eSIM 208, then the method 700 proceeds to step 710. At step 710, the eUICC OS 206 directs the request to a default eSIM 208, where the request causes the default eSIM 208 to generate the instructions for carrying out the eSIM-based action. These instructions are then provided back to the baseband component 110 at step 714, and the method 700 returns to step 706 where additional requests can be processed. If, however, at step 708, the eUICC OS 206 determines that the request includes information that identifies a specific eSIM 208 the eUICC OS 206, then the method 700 proceeds to step 712. At step 712, the eUICC OS 206 directs the request to the specific eSIM 208, where the request causes the specific eSIM to generate instructions for carrying out the eSIM-based action. These instructions are then provided back to the baseband component 110 at step 714, and the method 700 returns to step 706 where additional requests can be processed. It is noted that, in some cases, it can be beneficial or necessary for the eUICC OS 206 to, when communicating with the baseband component 110, include TLV components that specifically reference particular eSIMs 208. Accordingly, when the eUICC OS 206 identifies a scenario where inclusion of information associated with a particular eSIM 208 is appropriate, the eUICC OS 206 can supplement a command with a TLV component that references the particular eSIM 208. In turn, the baseband component 110 can analyze the TLV component included the command and carry out a response in accordance with the command.

Although the techniques described herein primarily involve communication between the eUICC 108 and the baseband component 110, it is noted that these techniques can be applied to other scenarios that involve communication between other hardware/software components that are auxiliary to the eUICC 108 and the baseband component 110. For example, the eUICC 108 can be configured to communicate with a base station 112/MNO 114 via specialized interfaces that logically bypass the baseband component 110. More specifically, and according to this example, TLV components can be communicated between the eUICC 108 and the base station 112/MNO 114 without requiring specialized handling of the TLV components by the baseband component 110.

Figure 8:
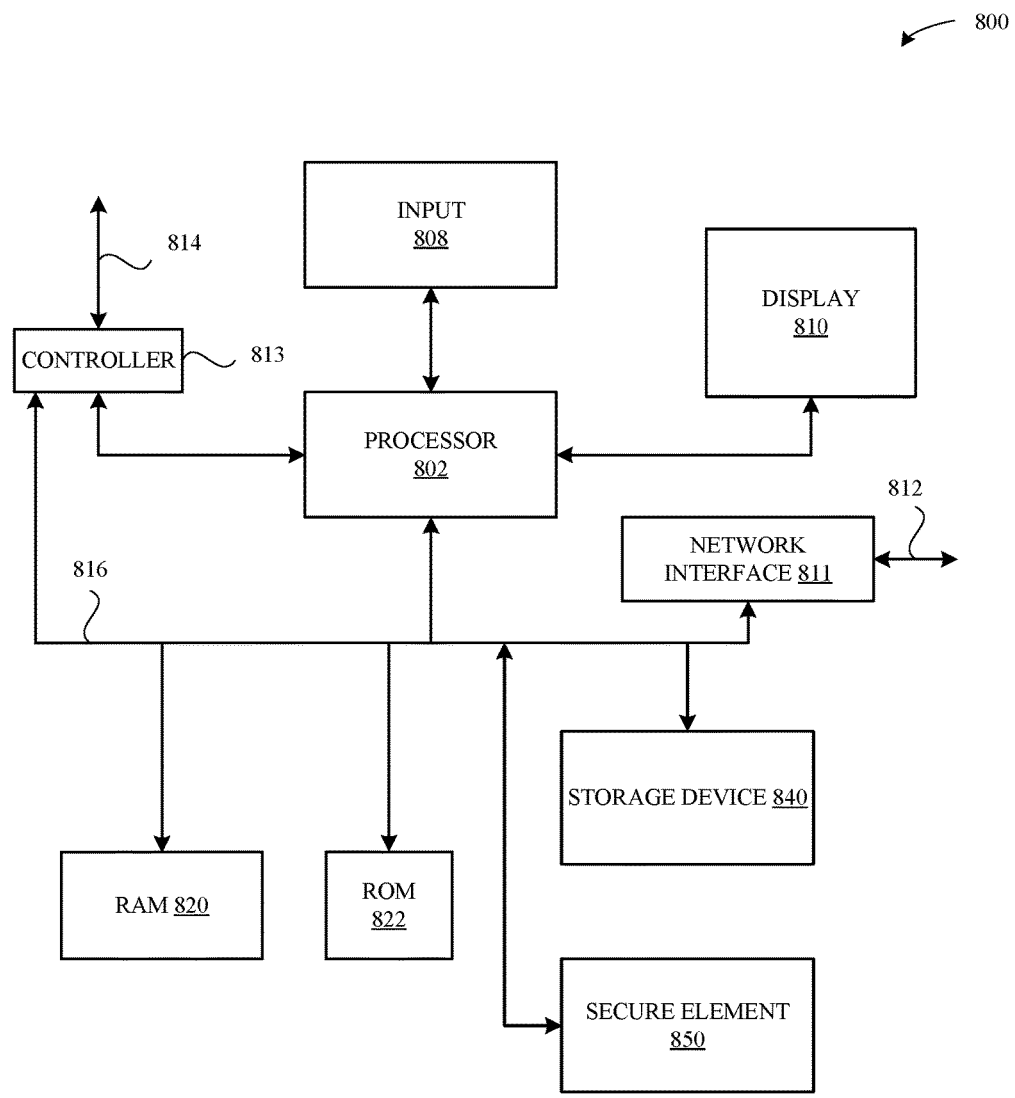
FIG. 8 illustrates a detailed view of a computing device that can be used to implement the various components described herein, according to some embodiments.

FIG. 8 illustrates a detailed view of a computing device 800 that can be used to implement the various components described herein, according to some embodiments. In particular, the detailed view illustrates various components that can be included in the mobile device 102 illustrated in FIG. 1. As shown in FIG. 8, the computing device 800 can include a processor 802 that represents a microprocessor or controller for controlling the overall operation of computing device 800. The computing device 800 can also include a user input device 808 that allows a user of the computing device 800 to interact with the computing device 800. For example, the user input device 808 can take a variety of forms, such as a button, keypad, dial, touch screen, audio input interface, visual/image capture input interface, input in the form of sensor data, etc. Still further, the computing device 800 can include a display 810 (screen display) that can be controlled by the processor 802 to display information to the user. A data bus 816 can facilitate data transfer between at least a storage device 840, the processor 802, and a controller 813. The controller 813 can be used to interface with and control different equipment through and equipment control bus 814. The computing device 800 can also include a network/bus interface 811 that couples to a data link 812. In the case of a wireless connection, the network/bus interface 811 can include a wireless transceiver.

The computing device 800 also include a storage device 840, which can comprise a single disk or a plurality of disks (e.g., hard drives), and includes a storage management module that manages one or more partitions within the storage device 840. In some embodiments, storage device 840 can include flash memory, semiconductor (solid state) memory or the like. The computing device 800 can also include a Random Access Memory (RAM) 820 and a Read-Only Memory (ROM) 822. The ROM 822 can store programs, utilities or processes to be executed in a non-volatile manner. The RAM 820 can provide volatile data storage, and stores instructions related to the operation of the computing device 800. The computing device 800 can further include a secure element 850, which can represent the eUICC 108 illustrated in FIGS. 1-2 and described in detail herein.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium. The computer readable medium is any data storage device that can store data which can thereafter be read by a computer system. Examples of the computer readable medium include read-only memory, random-access memory, CD-ROMs, DVDs, magnetic tape, hard disk drives, solid state drives, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. An electronic Universal Integrated Circuit Card (eUICC), comprising:
    a processor; and
    at least one memory configured to store electronic Subscriber Identity Modules (eSIMs) that are managed by the eUICC and instructions that, when executed by the processor, cause the eUICC to carry out operations that include:
    receiving a first request to provide an indication of the eSIMs that are managed by the eUICC;
    providing the indication, wherein the indication includes unique identifiers for each of the eSIMs that are managed by the eUICC;
    receiving, from a requesting entity, a second request to generate instructions for carrying out a particular action associated with a Mobile Network Operator (MNO), wherein the second request includes a unique identifier of a specific eSIM managed by the eUICC to which the second request is directed;
    directing the second request to the specific eSIM;
    receiving, from the specific eSIM, a set of instructions for carrying out the particular action; and
    providing the instructions to the requesting entity.

2. The eUICC of claim 1, wherein the requesting entity is an application executing on a mobile device or a baseband component included in a mobile device.

3. The eUICC of claim 1, wherein providing the indication comprises identifying eSIMs that are activated within the eUICC.

4. The eUICC of claim 3, wherein at least two eSIMs are activated within the eUICC.

5. The eUICC of claim 1, wherein the unique identifier is included in the second request using at least on type-length-value (TLV) component.

6. The eUICC of claim 5, wherein directing the second request to the specific eSIM comprises extracting the unique identifier from the TLV component and identifying the specific eSIM within the eUICC.

7. A non-transitory computer readable storage medium configured to store instructions that, when executed by a processor included in an embedded Universal Integrated Circuit Card (eUICC), cause the eUICC to route commands to specific electronic Subscriber Identity Modules (eSIMs) managed by the eUICC, by carrying out operations that include:
    receiving a first request to provide an indication of the eSIMs that are managed by the eUICC;
    providing the indication, wherein the indication includes unique identifiers for each of the eSIMs that are managed by the eUICC;
    receiving, from a requesting entity, a second request to generate instructions for carrying out a particular action associated with a Mobile Network Operator (MNO), wherein the second request includes a unique identifier of a specific eSIM managed by the eUICC to which the second request is directed;

directing the second request to the specific eSIM;
receiving, from the specific eSIM, a set of instructions for carrying out the particular action; and
providing the instructions to the requesting entity.

8. The non-transitory computer readable storage medium of claim 7, wherein the requesting entity is an application executing on a mobile device or a baseband component included in a mobile device.

9. The non-transitory computer readable storage medium of claim 7, wherein providing the indication comprises identifying eSIMs that are activated within the eUICC.

10. The non-transitory computer readable storage medium of claim 9, wherein at least two eSIMs are activated within the eUICC.

11. The non-transitory computer readable storage medium of claim 7, wherein the unique identifier is included in the second request using at least on type-length-value (TLV) component.

12. The non-transitory computer readable storage medium of claim 11, wherein directing the second request to the specific eSIM comprises extracting the unique identifier from the TLV component and identifying the specific eSIM within the eUICC.

13. The non-transitory computer readable storage medium of claim 7, wherein the specific eSIM is a virtualization of a physical SIM card.

14. A wireless device, comprising:
a baseband component; and
an electronic Universal Integrated Circuit Card (eUICC), comprising:
a processor, and
at least one memory configured to store (i) electronic Subscriber Identity Modules (eSIMs) that are managed by the eUICC, and (ii) instructions that, when executed by the processor, cause the eUICC to carry out operations that include:
receiving a first request to provide an indication of the eSIMs that are managed by the eUICC;
providing the indication, wherein the indication includes unique identifiers for each of the eSIMs that are managed by the eUICC;
receiving, from a requesting entity, a second request to generate instructions for carrying out a particular action associated with a Mobile Network Operator (MNO), wherein the second request includes a unique identifier of a specific eSIM managed by the eUICC to which the second request is directed;
directing the second request to the specific eSIM;
receiving, from the specific eSIM, a set of instructions for carrying out the particular action; and
providing the instructions to the requesting entity.

15. The wireless device of claim 14, wherein the requesting entity is an application executing on the wireless device or the baseband component.

16. The wireless device of claim 14, wherein providing the indication comprises identifying eSIMs that are activated within the eUICC.

17. The wireless device of claim 16, wherein at least two eSIMs are activated within the eUICC.

18. The wireless device of claim 14, wherein the unique identifier is included in the second request using at least on type-length-value (TLV) component.

19. The wireless device of claim 18, wherein directing the second request to the specific eSIM comprises extracting the unique identifier from the TLV component and identifying the specific eSIM within the eUICC.

20. The wireless device of claim 14, wherein the specific eSIM is a virtualization of a physical SIM card.

* * * * *